(12) United States Patent
Zhu

(10) Patent No.: US 12,463,744 B2
(45) Date of Patent: Nov. 4, 2025

(54) CYCLIC REDUNDANCY CHECK OPTIMIZATION

(71) Applicant: Nokia Technologies Oy, Espoo (FI)

(72) Inventor: Kai Zhu, Shanghai (CN)

(73) Assignee: Nokia Technologies Oy, Espoo (FI)

(*) Notice: Subject to any disclaimer, the term of this patent is extended or adjusted under 35 U.S.C. 154(b) by 496 days.

(21) Appl. No.: 18/010,067

(22) PCT Filed: Jun. 19, 2020

(86) PCT No.: PCT/CN2020/097231
§ 371 (c)(1),
(2) Date: Dec. 13, 2022

(87) PCT Pub. No.: WO2021/253443
PCT Pub. Date: Dec. 23, 2021

(65) Prior Publication Data
US 2023/0269025 A1    Aug. 24, 2023

(51) Int. Cl.
*H04L 1/00*    (2006.01)
*H04L 1/20*    (2006.01)

(52) U.S. Cl.
CPC .......... *H04L 1/0045* (2013.01); *H04L 1/0061* (2013.01); *H04L 1/203* (2013.01)

(58) Field of Classification Search
CPC ... H04L 1/0041; H04L 1/0045; H04L 1/0054; H04L 1/0057; H04L 1/0061; H04L 1/0064; H04L 1/0065; H03M 13/09; H03M 13/2906; H03M 13/13
See application file for complete search history.

(56) References Cited

U.S. PATENT DOCUMENTS

2017/0353271 A1*  12/2017  Kudekar ............... H04L 1/0041
2017/0366204 A1   12/2017  Shi et al.
2018/0183464 A1    6/2018  Ge
(Continued)

FOREIGN PATENT DOCUMENTS

CN    107659381 A    2/2018
CN    108429599 A    8/2018
(Continued)

OTHER PUBLICATIONS

Rached et al., "On the Sum of Order Statistics and Applications to Wireless Communication Systems Performances", arXiv, Nov. 12, 2017, pp. 1-26.
(Continued)

*Primary Examiner* — Shelly A Chase
(74) *Attorney, Agent, or Firm* — Nokia Technologies Oy

(57) ABSTRACT

Embodiments of the present disclosure relate to devices, methods, apparatus and computer readable storage media of CRC optimization. The method includes generating a set of decoded sequences of an encoded signal received from a second device; determining an activation state of a cycle redundant check based on an actual distribution property associated with the set of decoded sequences and a reference distribution property associated with the set of decoded sequences; and determining a likelihood of successful decoding at least based on the activation state. In this way, the FAR can be reduced and the expected joint FAR and BLER optimization can be achieved.

19 Claims, 7 Drawing Sheets

(56) References Cited

U.S. PATENT DOCUMENTS

| | | | |
|---|---|---|---|
| 2018/0287738 A1* | 10/2018 | Xu | ............... H04L 1/0064 |
| 2018/0323803 A1 | 11/2018 | Palgy et al. | |
| 2018/0323810 A1 | 11/2018 | Sarkis et al. | |
| 2018/0351581 A1 | 12/2018 | Presman | |
| 2019/0296859 A1* | 9/2019 | Jang | ............... H03M 13/09 |

FOREIGN PATENT DOCUMENTS

| | | |
|---|---|---|
| CN | 109196801 A | 1/2019 |
| CN | 110138497 A1 | 8/2019 |
| CN | 110582941 A | 12/2019 |
| CN | 110890940 A | 3/2020 |
| WO | 2018/141080 A1 | 8/2018 |
| WO | WO-2018/148866 A1 | 8/2018 |
| WO | 2018/171393 A1 | 9/2018 |
| WO | 2018/201737 A1 | 11/2018 |
| WO | 2018/204667 A1 | 11/2018 |
| WO | 2018/209486 A1 | 11/2018 |
| WO | 2018/214101 A1 | 11/2018 |
| WO | 2018/231924 A1 | 12/2018 |
| WO | WO 2019/133039 A1 | 7/2019 |
| WO | 2021/174484 A1 | 9/2021 |

OTHER PUBLICATIONS

Nadarajah, "Explicit Expressions for Moments of Log Normal Order Statistics", Stochastics and Quality Control, vol. 23, No. 02, 2008, pp. 267-279.

Dai et al., "Learning to Mitigate the FAR in Polar Code Blind Detection", IEEE Wireless Communications Letters, vol. 08, No. 06, Dec. 2019, pp. 1692-1695.

Office action received for corresponding Chinese Patent Application No. 202080102183.1, dated Nov. 29, 2024, 6 pages of office action and 2 pages of translation available.

Office action received for corresponding Chinese Patent Application No. 202080102183.1, dated Jun. 12, 2025, 6 pages of office action and 2 pages of translation available.

* cited by examiner

CYCLIC REDUNDANCY CHECK OPTIMIZATION

CROSS REFERENCE TO RELATED APPLICATION

This patent application is a U.S. National Stage application of International Patent Application Number PCT/CN2020/097231 filed Jun. 19, 2020, which is hereby incorporated by reference in its entirety.

FIELD

Embodiments of the present disclosure generally relate to the field of telecommunication and in particular, to devices, methods, devices and computer readable storage media of Cyclic Redundancy Check (CRC) optimization.

BACKGROUND

Polar code is used as the forward error control coding scheme to protect the control signaling (both downlink and uplink) for 5G NR. Purpose of a forward error control code is to facilitate the detection and correction of bit errors at the receiving side in the physical layer. A good code thereby should strive to minimize the bit/block error rate (BER/BLER).

In practical system, data payload is generally concatenated with CRC code to verify if the data is correctly recovered after the decoding of the forward error control code. However, it is known that neither CRC code is 100% reliable by principle. For example, it is possible the recovered bit sequence is correct, but it fails the CRC check. It is also possible that the recovered bit sequence is actually erroneous, but it managed to pass the CRC check. The former case is referred to as missed detection while the latter is called false alarm.

For 5G hyper critical vertical applications, such as URLLC, smart factory, tele-surgery, both metrics are required to be significantly lower in order to enable the very aggressive performance, e.g. BLER down to 10-4 to 10-5, while keeping FAR at 1% level or even lower.

SUMMARY

In general, example embodiments of the present disclosure provide a solution of CRC optimization.

In a first aspect, there is provided a first device. The first device comprises at least one processor; and at least one memory including computer program codes; the at least one memory and the computer program codes are configured to, with the at least one processor, cause the first device at least to generate a set of decoded sequences of an encoded signal received from a second device; determine an activation state of a cycle redundant check based on an actual distribution property associated with the set of decoded sequences and a reference distribution property associated with the set of decoded sequences; and determine a likelihood of successful decoding at least based on the activation state.

In a second aspect, there is provided a method. The method comprises generating a set of decoded sequences of an encoded signal received from a second device; determining an activation state of a cycle redundant check based on an actual distribution property associated with the set of decoded sequences and a reference distribution property associated with the set of decoded sequences; and determining a likelihood of successful decoding at least based on the activation state.

In a third aspect, there is provided an apparatus comprises means for generating a set of decoded sequences of an encoded signal received from a second device; means for determining an activation state of a cycle redundant check based on an actual distribution property associated with the set of decoded sequences and a reference distribution property associated with the set of decoded sequences; and means for determining a likelihood of successful decoding at least based on the activation state.

In a fourth aspect, there is provided a computer readable medium having a computer program stored thereon which, when executed by at least one processor of a device, causes the device to carry out the method according to the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
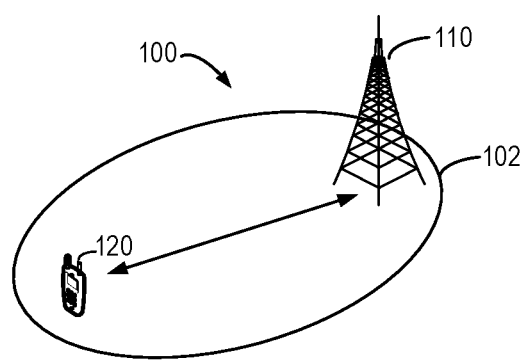
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 comprises a receiving device 110 (hereafter also referred to as a first device 110 or a network device 110) and a transmitting device 120 (hereafter also referred to as a second device 120 or a terminal device 120). The transmitting device 120 may communicate with the receiving device 110. It is to be understood that the number of network devices and terminal devices shown in FIG. 1 is given for the purpose of illustration without suggesting any limitations. The communication network 100 may include any suitable number of network devices and terminal devices. Furthermore, it is to be understood that the receiving device may also be referred to the terminal device 120 and the transmitting device may also be referred to as the network device 110.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As described above, polar code is used as the forward error control coding scheme to protect the control signaling (both downlink and uplink) for 5G NR. Purpose of a forward error control code is to facilitate the detection and correction of bit errors at the receiving side in the physical layer. A good code thereby should strive to minimize the bit/block error rate (BER/BLER).

In practical system, data payload is generally concatenated with CRC code to verify if the data is correctly recovered after the decoding of the forward error control code. However, it is known that neither CRC code is 100% reliable by principle. For example, it is possible the recovered bit sequence is actually correct, but it fails the CRC check. It is also possible that the recovered bit sequence is actually erroneous, but it managed to pass the CRC check. The former case is referred to as missed detection while the latter is called false alarm.

This could be caused by certain reasons such as impairment of channel estimation or rate matching mismatch. To summarize, for a good forward error control coding scheme, it is crucial to minimize not only BLER, but also lower false alarm rate (FAR) and missed detection rate as much as possible.

Furthermore, according to discussions during Release 15 Polar code standardization, optimization of BLER and FAR is particularly challenging. Attempt of lowering one metric will cause the other go higher, it seems not possible to minimize both simultaneously.

For 5G hyper critical vertical applications, such as URLLC, smart factory, tele-surgery, both metrics are required to be significantly lower in order to enable the very aggressive performance, e.g. BLER down to 10-4 to 10-5, while keeping FAR at 1% level or even lower.

In the FAR improvement related discussions, it has been proposed that FAR requirement was met by extending the number of CRC bits, to as long as 24 bits (reliability of CRC check is proportional to the length of CRC). However, it would decrease the efficiency of radio transmission as the ratio of data payload versus CRC bits is lowered. Furthermore, the complexity of implementing a 24-bits long CRC is more difficult than a shorter CRC code. Therefore, it is difficult to achieve the stringent BLER and FAR requirements of 5G hyper critical vertical applications by further extending the CRC length.

Moreover, the standardized construction method of uplink Polar code is the so-called CA-Polar. The decoding of CA-Polar will consume part of CRC bits. In other words, N out of 6 CRC bits will be used for the decoding of Polar code instead of providing integrity check. The number N depends on the list size used by Polar decoder. N is generally greater than 2, meaning the number of CRC left to be used for integrity check is no more than 3 bits. 3-bit CRC can only guarantee FAR of 12.5%, therefore the gap is more than 10 times.

Some approaches have been proposed to reduce the FAR or improve decoding BLER performance, but neither approach is able to perform joint optimization. For example, lower BLER can be achieved by increasing the decoding list size, in which one dominant parameter of the successive cancellation list decoder used at the receiver side and $8=2^3$ is usually used as the sweet spot between performance and complexity. However, the side effect is that, list size increased to 16 is equivalent to increase the FAR to 25%, while the target FAR is 1%. Hence, this method is not suitable.

Furthermore, some discussion proposes using path metric (PM) to reduce the FAR. However, there will be significant impact on the decoding performance and may cause missed detection. The reason is if only path metric is used, it needs perfectly accurate estimation because the margin to make the correct decision is very tight. But it cannot be accurate in practice based on extremely limited number of path metric values.

A further approach proposes eliminating the issue of FAR by giving up CRC, which causes that CRC aided Polar decoding becomes impossible. Polar code by itself, especially at short block size (e.g. size of typical UCI payload), has extremely poor BLER performance until CRC is integrated into Polar decoding. Thus, CRC plays very important role and omission of CRC is not feasible. Another problem is that there is no way to perform integrity check. Thereby, it becomes uncertain if the recovered bit sequence is the same as what was transmitted. Apparently, this makes omission of CRC infeasible.

Therefore, the embodiments of the present invention propose a solution to achieve the objective of joint FAR and BLER optimization. In this solution, when a decoding procedure is performed for the encoded signal and the set of decoded sequences has been generated, the receiving device may compare the actual distribution property associated with the set of decoded sequences with a reference distribution property associated with the set of decoded sequences and determine whether the CRC is to be activated based on the comparison. The likelihood of successful decoding may be determined based on the activation state of the CRC. In this way, the FAR can be reduced and the expected joint FAR and BLER optimization can be achieved.

Figure 2:
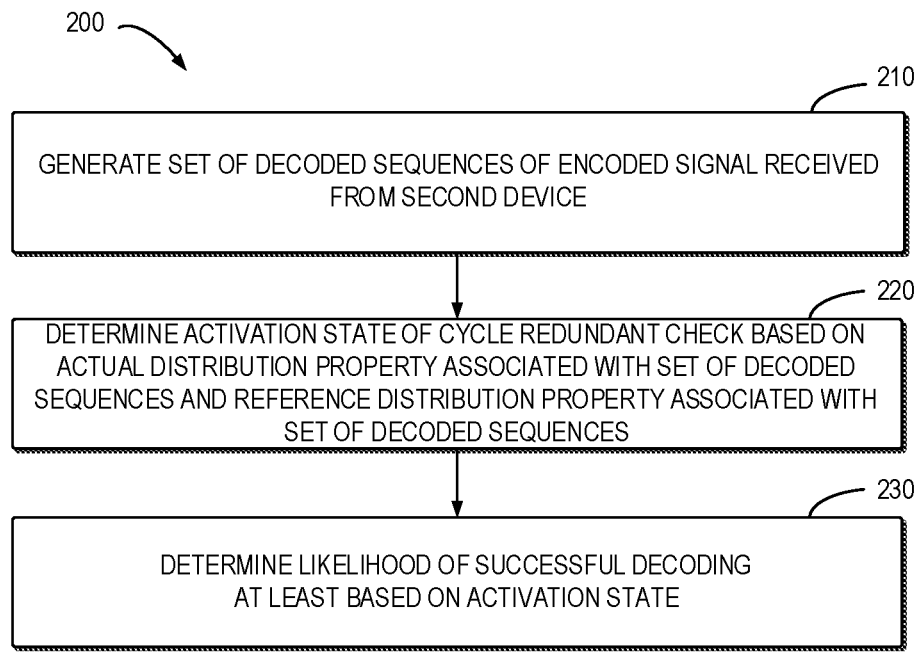
FIG. 2 shows a flowchart of an example method of enhanced decoding for polarization code according to some example embodiments of the present disclosure.

Principle and implementations of the present disclosure will be described in detail below with reference to FIG. 2. FIG. 2 shows a flowchart of an example method 200 of enhanced decoding according to some example embodiments of the present disclosure. The method 200 can be implemented at the receiving device 110 as shown in FIG. 1. For the purpose of discussion, the method 200 will be described with reference to FIG. 1.

In a transmission of a signal sequence from the transmitting device 120 to the receiving device 110, the signal sequence should be encoded based on the specific coding pattern before the transmission to avoid the security risk during the transmission. When the receiving device 110 receives the encoded signal sequence, the receiving device 110 should decode the encoded signal sequence, to obtain the original signal sequence.

As shown in FIG. 2, at 210, the receiving device 110 generate a set of decoded sequences of an encoded signal received from the transmitting device 120. For example, CRC assisted Successive Cancelation List decoding (SCL-CRC) can be used for the decoding procedure.

For example, the received encoded signal sequence input can be firstly demodulated by a soft demodulator, the output is log-likelihood ratio (LLR) sequence denoted as y.

$$y = \{y_0, y_1, y_2, \ldots, y_{n-2}, y_{n-1}\} \quad (1)$$

In the LLR sequence y, each element can be referred to a likelihood of a binary value 0 or a binary value 1 for the corresponding bit of the original signal sequence.

From here onwards, the processing will be carried out at log-domain in the form of LLR.

$$LLR = \log\frac{(u_i = 0 \mid y)}{(u_i = 1 \mid y)} = \log\frac{(u_i = 0 \mid u_0, \ldots, y)}{(u_i = 1 \mid u_0, \ldots, u_{i-1}, y)} \quad (2)$$

The Equation (2) is the log-ratio of two conditional probabilities conditioned on the received y. Where y is the bit sequence received at receiving device 110, $u_i$ is the i-th bit transmitted by transmitting device 120. It is to be understood that LLR can also be defined the other way around with numerator and denominator swapped.

The basic principle of CRC assisted SCL decoding is to track multiple decoding paths throughout the decoding process till the decoding of last coded bit. Usually some metric is used to evaluate the correctness of taking a particular path against all possible paths in terms of likelihood or probability, one of which is the so-called path metric (PM) which is calculated during the decoding process. The multiple tracks of paths are kept and maintained by a list. The size of list can be constant by removing the old path with least likelihood and adding new path with higher likelihood.

For example, a path metric for the i-th hypothesis bit taking the l-th path, i.e. $u_l^i$, can be defined as:

$$PM_l^i = \begin{cases} PM_l^{i-1}, & \text{if } u_l^i = (1 - \text{sign}(|LLR_n^i|))/2 \\ PM_l^{i-1} - |LLR_n^i|, & \text{otherwise.} \end{cases} \quad (3)$$

$$\text{where sign}|x| = \begin{cases} -1, & x < 0 \\ 1, & x \geq 0 \end{cases}.$$

In some example embodiments, for generating a set of decoded sequences, the receiving device 110 may constructing a binary tree for decoding the encoded signal. For example, as described above, each element of the likelihood sequence may represent a likelihood of the binary value 1 or 0 for each bit of the original signal sequence. A binary tree can be constructed by processing each element of the likelihood sequence successively.

By traversing the binary tree, the receiving device 110 may determine a plurality of the decoding path, i.e. the path metrics. For example, there is a path metric computed for each possible path. The individual path metric may represent the likelihood of taking a particular path from one node of binary tree to another.

During the tree traversal process, new path metrics keeps being generated. For example, a maximum number L of path metrics can be held, where L is the list size. Thus, path metrics are sorted in ascending/descending order and compared with each other, new path metrics get into the top of this list, whereas path metrics at the bottom of list may be eliminated.

This process is repeated in successive manner till the last bit. Therefore, a list containing L most promising path metrics may be obtained, which can be considered as the set of decoded sequences. That is, the receiving device 110 may determine the set of decoded sequences based on the plurality of the decoding path.

Referring back to FIG. 2, at 220, the receiving device 120 determine an activation state of a cycle redundant check based on an actual distribution property associated with the set of decoded sequences and a reference distribution property associated with the set of decoded sequences. To this aim, the receiving device 120 may determine the actual distribution property associated with the set of decoded sequences.

The determination of the actual distribution property associated with the set of decoded sequences may depend on the values characterizing an accuracy of a decoding path for each decoded sequence in the set of decoded sequences. Hereinafter the values may also be referred to as PM values.

As mentioned above, a plurality of decoding path may be generated in the decoding process by traversing the tree structure. There is only one correct decoding path, but the decoder may search basically all the paths. When tree pruning is enabled, some portion of the paths are pruned and a relatively small batch is maintained. The PM value for each decoding path may be used to evaluate whether a path needs to be kept or dropped. Generally, the PM value is accumulated by negative values/penalties, and this means PM value will either stay the same or become smaller after each decoding step. In other words, values characterizing an accuracy of a decoding path may be associated with every bit in each decoded sequence in the set of decoded sequences.

It is to be understand that the PM value for most paths would be a negative value with very large absolute value, except the correct path. For each new decoding step, the increased penalty will be much smaller than the current PM value, so this means the differences between one step and the other will not change much. Since every new PM value will be compared with others during the decoding process, it will be pruned if its PM is not part of the top PM values. Therefore, this means there is a trend that all the paths, except the correct one, will be similar, or converge. As a result, two conjectures for the PM values can be obtained:

$$PM_i^x \underset{x \to \infty}{\Longrightarrow} \text{a large negative value} \quad (4)$$

$$\frac{PM_i^x}{\text{Mean}(PM_1^x, PM_2^x, \ldots, PM_n^x)} \underset{x \to \infty}{\Longrightarrow} \text{a small value} \quad (5)$$

Base on the PM values, the receiving device 110 may determine the actual distribution property associated with the set of decoded sequences. For example, the actual distribution property associated with the set of decoded sequences may be determined by performing a normal distribution operation for the PM values. The actual distribution property associated with the set of decoded sequences may also be referred to as instantaneous moment.

Furthermore, the determination the reference distribution property associated with the set of decoded sequences associated with the set of decoded sequences may depend on a threshold probability of difference between the reference distribution property and the actual distribution property.

The threshold probability of difference may be determined in offline process. In the offline process, the number of bits for checking the set of decoded sequences can be determined. For example, the bits may comprise at least one of PC bits and CRC bits. The configuration of the bits may depend on BLER. It is possible to have different configurations for different BLER. The rest of PC bits and CRC bits is then used for tree pruning to minimize residual error. In some cases (very high SNR, very good receiving quality), the PC checking might be even unnecessary, i.e. 0 PC bits.

It is to be understood that the split of PC bits and CRC bits for different purposes is based on empirical approach, the exact ratio is up to fine tuning during system implementation as well as the total number of bits available.

In the offline process, it is also important to find the threshold probability of difference between the reference distribution property and the actual distribution property. The difference may be referred to as a theoretical threshold γ, which describes the joint correlation among BLER, number of PC bits and CRC bits, target FAR. The threshold is used to decide if CRC checking should be performed, it can be computed as follows.

$$\gamma = \frac{\text{Combined}_{FAR} * 2^{P+C}}{BLER} \quad (6)$$

where

Combined$_{FAR}$ is the target combined/averaged/overall FAR, e.g. 1%;

P refers to the number of PC bits;

C is the effective number of CRC bits used for checking. Note that the effective number of CRC bits means the remained CRC bits used for checking because in the list decoding with size L, log 2 (L) CRC bits are equivalently consumed, which is the total number of CRC bits excluding log 2 (L). Note that P and C depend on the estimated BLER;

BLER is the current estimated BLER, ranging from 0 to 1.

The motivation of setting this threshold in place is that: when BLER is high, the risk of FAR is also high, so the checking will be strictly controlled. When BLER is low, the risk of FAR is also low, so checking can be saved. This means the threshold of whether performing the CRC checking is derived according to the BLER.

The BLER, theoretical threshold γ, number of PC and CRC bits and target FAR can be summarized as below. For example, suppose the list size used by polar decoder is 8 and at most 2 PC bits available, according to Equation (1), the relationship of BLER, FAR and number of checking bits (PC+CRC) to be used is given below. In this case, the list size of 8=2^3, means that 3 CRC bits will be consumed by decoding, thereby the available CRC bits is 6−3=3. A total number of 6 is defined by Specification and frozen.

TABLE 1

PC and CRC decision threshold with maximum 2 PC bits

| BLER | PC bits + CRC bits | Combined FAR | Theoretical threshold γ |
|---|---|---|---|
| 1 | 2 + 3 | 0.01 | 0.32 |
| 0.9 | 2 + 3 | 0.01 | 0.36 |
| 0.8 | 2 + 3 | 0.01 | 0.4 |
| 0.5 | 2 + 3 | 0.01 | 0.64 |
| 0.4 | 2 + 3 | 0.01 | 0.8 |
| 0.32 | 2 + 3 | 0.01 | 1 |
| 0.16 | 1 + 3 | 0.01 | 1 |
| 0.08 | 0 + 3 | 0.01 | 1 |
| 0.04 | 0 + 2 | 0.01 | 1 |
| 0.02 | 0 + 1 | 0.01 | 1 |
| 0.01 | 0 + 0 | 0.01 | 1 |
| 0.001 | 0 + 0 | 0.001 | 1 |

The main advantage is that the solution of the present invention does not require a very accurate threshold, meaning the margin to tolerate imperfect estimation of path metric is large, thus the solution is friendly for implementation. The table can be interpreted in the following way, for example, as shown in the 1st row, when the BLER is 1, it does not need to perform CRC check to decide each block is correct or not, instead it is reasonable to deem it an unsuccessful decoding without CRC checks. As shown in Table-1, γ=0.32, this implies 1−0.32=68% likelihood we made the right decision without relying on CRC, this is good enough.

Figure 3:
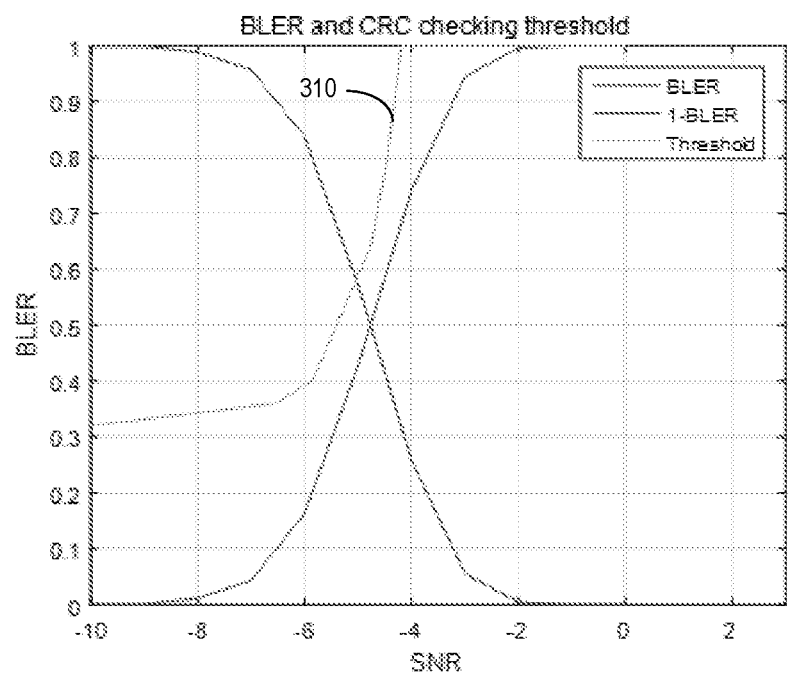
FIG. 3 shows an example curve of the theoretical threshold according to some example embodiments of the present disclosure.

FIG. 3 shows an example curve of the theoretical threshold according to some example embodiments of the present disclosure. As shown in FIG. 3, in most of the areas, the threshold curve 310 is above the theoretical non-checking region bound, i.e. 1-BLER curve, so it will not impact on the BLER performance.

Figure 4:
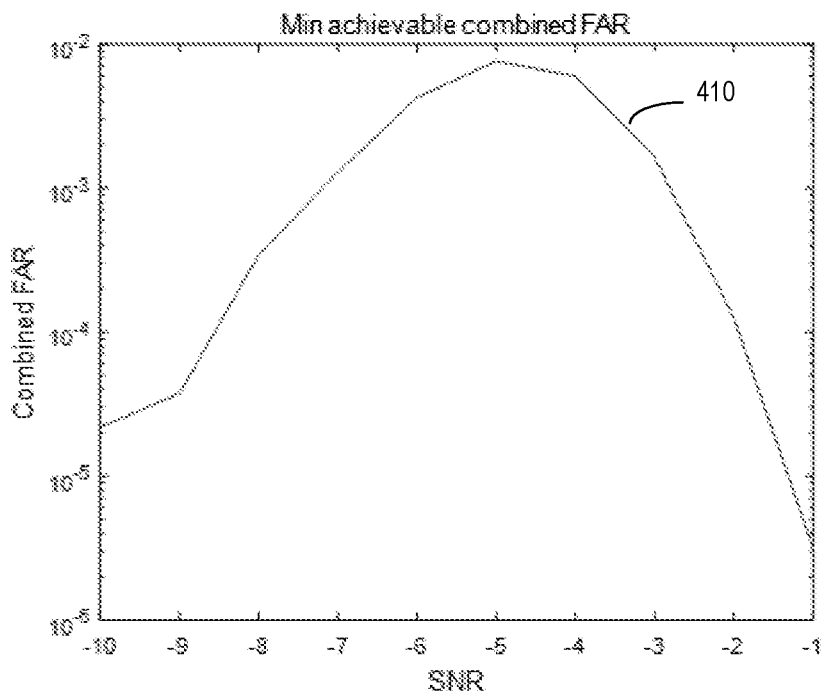
FIG. 4 shows an example achievable combined FAR according to some example embodiments of the present disclosure.
Figure 5A:
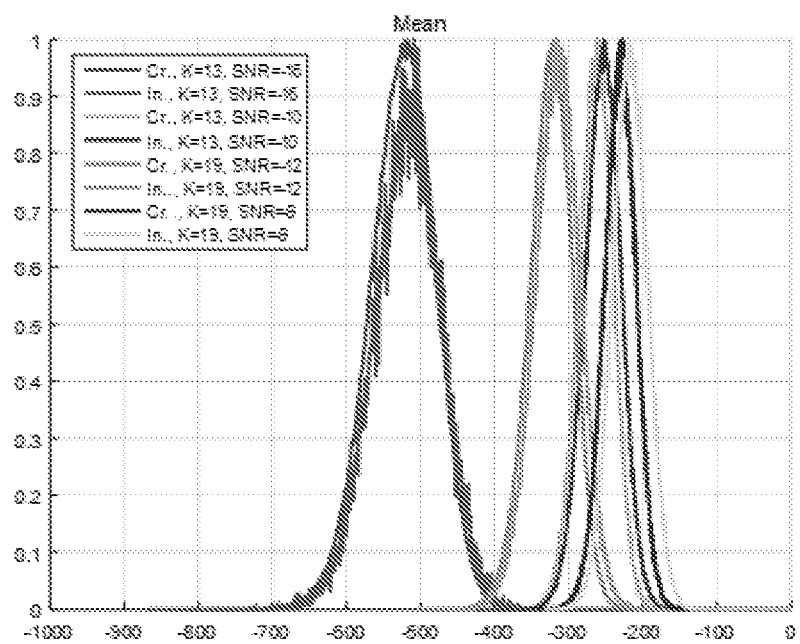
FIGS. 5A-5D show the results of the simulation in $1^{st}$~$4^{th}$ moment, respectively according to some example embodiments of the present disclosure.
Figure 5B:
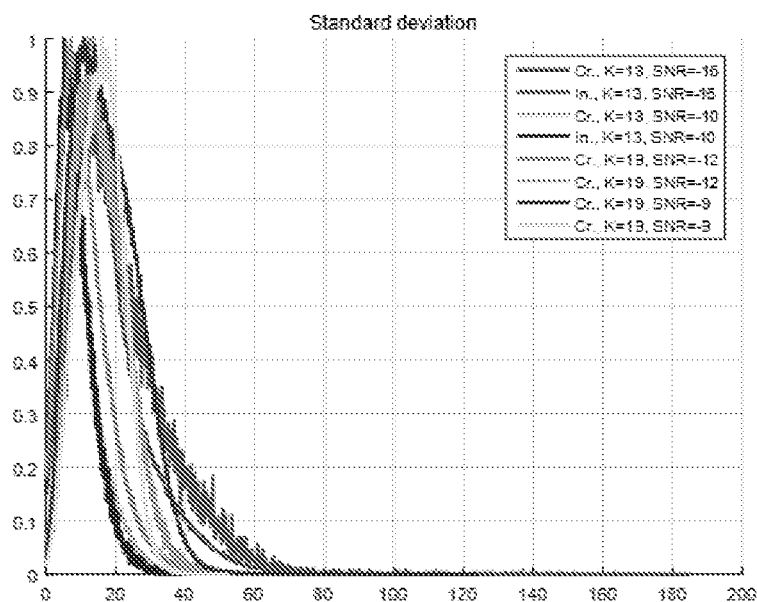
Figure 5C:
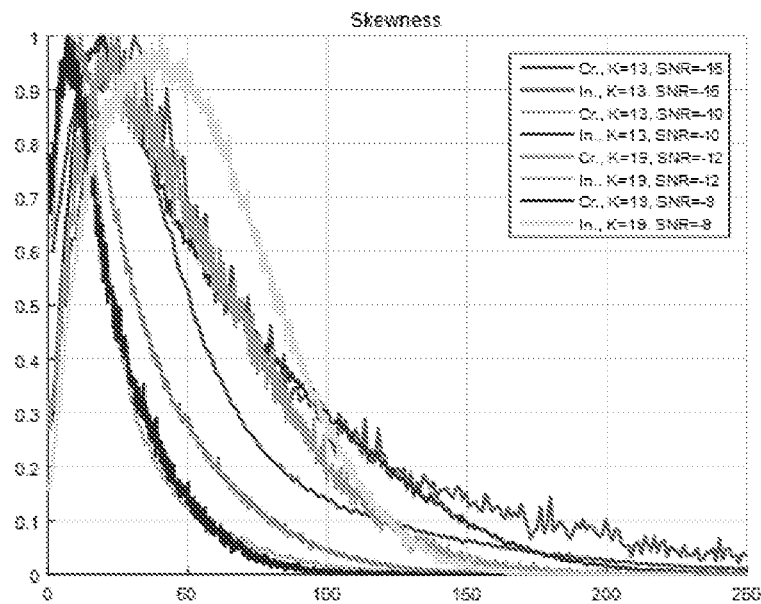
Figure 5D:
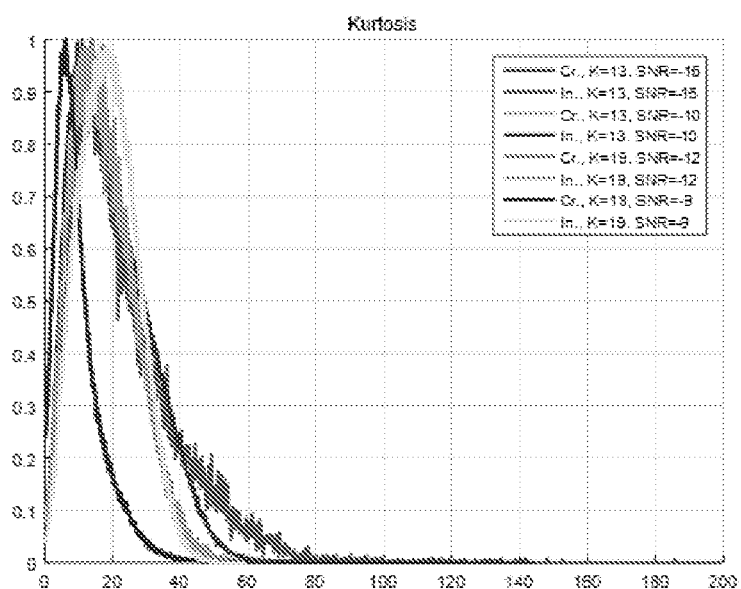

FIG. 4 shows an example achievable combined FAR according to some example embodiments of the present disclosure. The achievable combined FAR may be considered the overall effective FAR observed by the receiving side. The combined FAR curve 410 reaches the peak in the middle and drops quickly to very low level. Fortunately, the peak is still lower than the required 1% target. If larger list size is used, e.g. 16, the combined FAR would exceed 1% so it might be useful to reduce the list size in this area or set a conservative checking threshold which may affect the BLER performance. It is to be understood that the results shown in FIG. 2 are specific to certain code block, code rate configuration, but others would have similar shape of the curve with some left or right shift along X axis.

In another example, in which case there are at most 3 PC bits available, following similar principle, the threshold and checking bits configuration are given below:

TABLE 2

PC and CRC decision threshold with maximum 3 PC bits

| BLER | PC bits + CRC bits | Combined FAR | Threshold |
|---|---|---|---|
| 1 | 3 + 3 | 0.01 | 0.64 |
| 0.9 | 3 + 3 | 0.01 | 0.72 |
| 0.8 | 3 + 3 | 0.01 | 0.8 |
| 0.5 | 3 + 3 | 0.01 | 1 |
| 0.4 | 3 + 3 | 0.01 | 1 |
| 0.32 | 2 + 3 | 0.01 | 1 |
| 0.16 | 1 + 3 | 0.01 | 1 |
| 0.08 | 0 + 3 | 0.01 | 1 |
| 0.04 | 0 + 2 | 0.01 | 1 |
| 0.02 | 0 + 1 | 0.01 | 1 |
| 0.01 | 0 + 0 | 0.01 | 1 |
| 0.001 | 0 + 0 | 0.001 | 1 |

As described above, the threshold probability of difference between the reference distribution property and the actual distribution property, i.e., the theoretical threshold $\gamma$ can be determined. Then the reference distribution property can be determined based on the threshold probability and the actual distribution property.

First the x-th moment-based scheme can be selected. For one specific SNR, the probability of instantaneous moment (computed during decoding run time) is smaller than this threshold $\beta$ at specific SNR point, should be equal to the calculated theoretical threshold $\gamma$. Mathematically speaking, the connection between instantaneous moment and the reference distribution property (threshold $\beta$) can be shown as below:

$$\text{Prob(instantaneous moment} < \beta(SNR)) == \gamma \quad (7)$$

As mentioned above, the actual distribution property associated with the set of decoded sequences, i.e. the instantaneous moment, may be determined by performing a normal distribution operation for the PM values. Thus the reference distribution property (threshold $\beta$) can be determined.

In some example embodiments, the threshold $\beta$ can also be fixed and associated with PM values. Suppose there are n PM values ($PM_1, PM_2, \ldots, PM_n$), five possible statistical methods for our investigation could be either of the following:

Range: Max($PM_1, PM_2, \ldots, PM_n$)-Min($PM_1, PM_2, \ldots, PM_n$)

1st moment (aka Mean): Mean($PM_1, PM_2, \ldots, PM_n$)

2nd moment (aka Standard deviation): Sqrt(var($PM_1, PM_2, \ldots, PM_n$))

3rd moment, i.e. skewness, Skewness($PM_1, PM_2, \ldots, PM_n)^{1/3}$

4th moment, i.e. kurtosis: Kurtosis($PM_1, PM_2, \ldots, PM_n)^{1/4}$

For the statistical methods "Range", assuming all the PM values are re-ordered to make $PM_1$ is the largest value, then $$PM_i = PM_i - PM_1 \quad (8)$$

The range method now becomes:

$$-\text{Min}(PM_1, PM_2, \ldots, PM_n) \quad (9)$$

Considering the absolute value, it becomes the maximum value. The mathematical expectation is:

$$E[Y] = -\int_0^\infty \left(1 - \phi\left(\frac{\ln y - \mu}{\sigma}\right)\right)^n dy \quad (10)$$

Where $\Phi$ is the CDF of the standard normal distribution.

For the $1^{st}$~$4^{th}$ moment, the mathematical expectation of the moments of a series of order statistics obeying lognormal distribution can be found. FIGS. 5A-5D show the results of the simulation in $1^{st}$~$4^{th}$ moment, respectively.

As shown in FIGS. 5A-5D, in the simulation, two block sizes and two SNRs are evaluated and the PM values are processed to check its distributions, where Cr. means correct blocks and In. means incorrect blocks. It is preferable the PM value distributions of the same type of blocks, correct or incorrect overlap as much as possible, and separate from that of the other type of blocks as much as possible. One may find mean method is better than range method, and standard deviation is better, and the best is the fourth moment. It is very stable, which insensitive to SNR and block sizes.

When both actual distribution property associated with the set of decoded sequences and a reference distribution property associated with the set of decoded sequences are determined, the receiving device 120 may compare the actual distribution property of accuracies with the reference distribution property associated with the set of decoded sequences, to determine the activation state of a cycle redundant check.

Referring back to FIG. 2, if the actual distribution property is less than the reference distribution property, the receiving device 120 may activating the cycle redundant check for the set of decoded sequences. At 230, the receiving device 120 may determine the likelihood of successful decoding based on a result of the cycle redundant check.

If the actual distribution property exceeds the reference distribution property, the decoding procedure can be considered as fail. That is, the cycle redundant check is not to be activated anymore and the decoding for the encoded signal will be performed again.

Figure 6A:
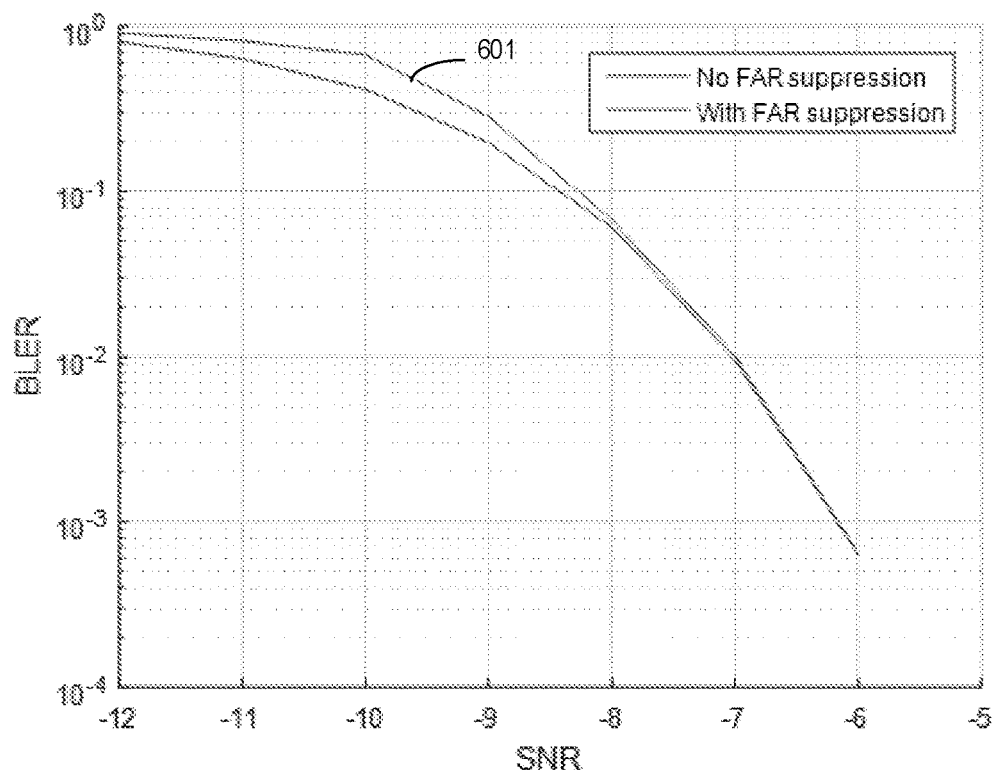
FIGS. 6A-6B shows example simulation results according to some example embodiments of the present disclosure.
Figure 6B:
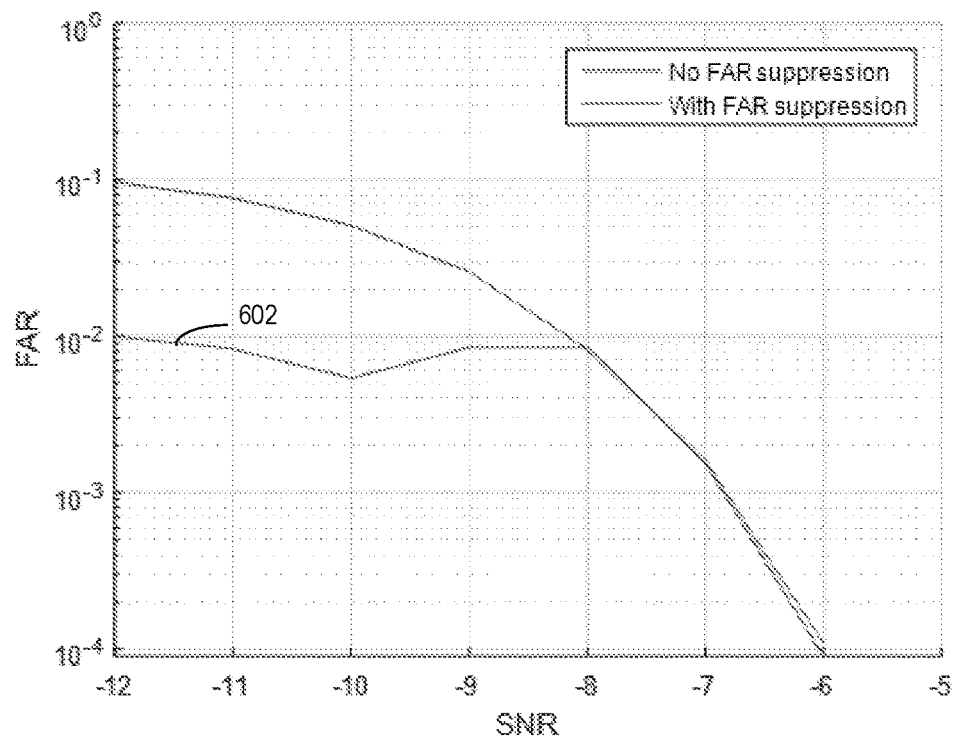

FIGS. 6A and 6B shows example simulation results according to some example embodiments of the present disclosure. Specifically, FIG. 6A shows the simulation result of the decoding performance, while FIG. 6B shows the simulation result of the FAR comparison. In this simulation, data payload length w/o CRC, denoted as K, is 19 and encoded Polar codeword sequence N is 336 in this case. A constant threshold value $\beta$ is used for all the SNRs, $\beta=-10$ dB. Performance could be further improved by tighter threshold and SNR-dependent thresholds. Furthermore, all the CRC bits are used for checking. It is possible as discussed above that at the high SNR region the part or all the CRC bits could be used for pruning. It can be seen from FIGS. 6A and 6B, the decoding performance (curve 601) is improved and the FAR (curve 602) is reduced effectively and below 1% for all the SNR conditions. This means the proposed method works well.

In some example embodiments, an apparatus capable of performing the method 500 (for example, implemented at the network device 220) may comprise means for performing the respective steps of the method 500. The means may be implemented in any suitable form. For example, the means may be implemented in a circuitry or software module.

In some example embodiments, the apparatus comprises means for generating a set of decoded sequences of an encoded signal received from a second device; means for determining an activation state of a cycle redundant check based on an actual distribution property associated with the set of decoded sequences and a reference distribution property associated with the set of decoded sequences; and means for determining a likelihood of successful decoding at least based on the activation state.

In the solution of the present invention, the FAR can be alleviated by reducing the number/frequency of performing CRC checks, such that the improve decoding BLER performance can be improved and meanwhile the FAR can be reduced. In this way, the FAR can be reduced to 1% without increase the number of CRC bits and the expected joint FAR and BLER optimization can be achieved.

Figure 7:
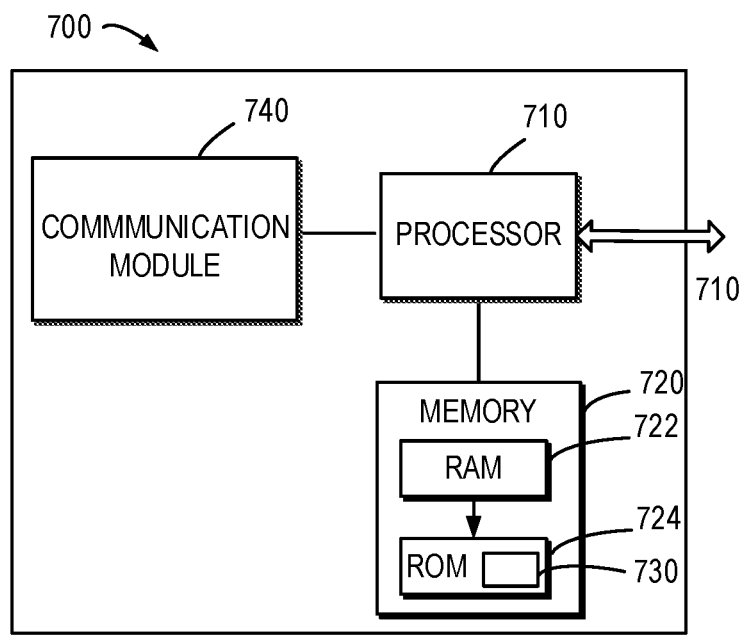
FIG. 7 shows a simplified block diagram of a device that is suitable for implementing example embodiments of the present disclosure.
Figure 8:
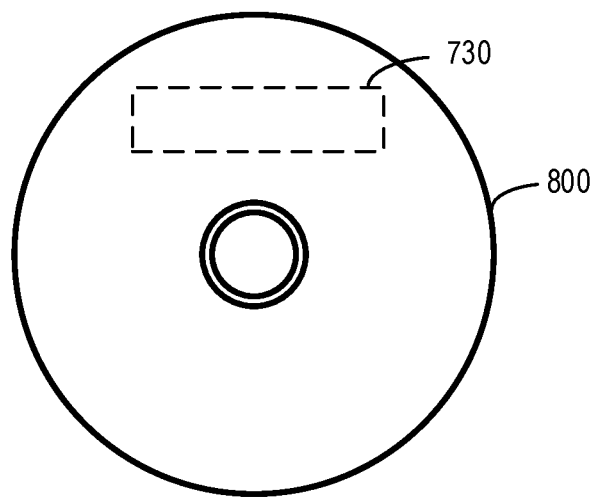
FIG. 8 shows a block diagram of an example computer readable medium in accordance with some embodiments of the present disclosure.

FIG. 7 is a simplified block diagram of a device 700 that is suitable for implementing embodiments of the present disclosure. The device 700 may be provided to implement the communication device, for example the receiving device 120 as shown in FIG. 1. As shown, the device 700 includes one or more processors 710, one or more memories 740 coupled to the processor 710, and one or more transmitters and/or receivers (TX/RX) 740 coupled to the processor 710.

The TX/RX 740 is for bidirectional communications. The TX/RX 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 720. The processor 710 may perform any suitable actions and processing by loading the program 730 into the RAM 720.

The embodiments of the present disclosure may be implemented by means of the program 730 so that the device 700 may perform any process of the disclosure as discussed with reference to FIG. 2. The embodiments of the present disclosure may also be implemented by hardware or by a combination of software and hardware.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 7. shows an example of the computer readable medium 700 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one non-transitory memory storing instructions that, when executed with the at least one processor, cause the first device at least to:
   generate a set of decoded sequences of an encoded signal received from a second device;
   determine an activation state of a cycle redundant check based on an actual distribution property associated with the set of decoded sequences and a reference distribution property associated with the set of decoded sequences; and
   determine a likelihood of successful decoding at least based on the activation state.

2. The first device of claim 1, wherein the instructions, when executed with the at least one processor, cause the first device to generate the set of decoded sequences by:
   constructing a binary tree for decoding the encoded signal;
   determining a plurality of decoding paths by performing a traversal procedure of the binary tree; and
   generating the set of decoded sequences based on the plurality of decoding paths.

3. The first device of claim 1, wherein the instructions, when executed with the at least one processor, cause the first device to:
   determine an estimation of a block error rate for the signal;
   determine a number of bits used for checking the set of decoded sequences;
   determine a threshold probability of difference between the reference distribution property and the actual distribution property based on a target false alarm rate for decoding the signal, the estimation of the block error rate and the number of bit;
   determine the actual distribution property based on the set of decoded sequences; and
   determine the reference distribution property based on the threshold probability and the actual distribution property.

4. The first device of claim 3, wherein the bits for the checking comprises at least one of following:
   a first set of bits for performing the cycle redundant check, or
   a second set of bits for performing a parity check.

5. The first device of claim 1, wherein the instructions, when executed with the at least one processor, cause the first device to:
   determine values characterizing an accuracy of a decoding path for each decoded sequence of the set of decoded sequences based on bits in each decoded sequence; and
   determine the actual distribution property based on the values.

6. The first device of claim 1, wherein the instructions, when executed with the at least one processor, cause the first device to determine the activation by:
   comparing the reference distribution property with the actual distribution property; and
   in accordance with a determination that the actual distribution property is less than the reference distribution property, activating the cycle redundant check for the set of decoded sequences.

7. The first device of claim 1, wherein the instructions, when executed with the at least one processor, cause the first device to determine the likelihood of successful decoding by:
   in accordance with a determination that the activation state indicating that the cycle redundant check fails to be activated, determining a failure of the decoding.

8. The first device of claim 1, wherein the instructions, when executed with the at least one processor, cause the first device to determine the likelihood of successful decoding by:
   in accordance with a determination of the activation state indicating that the cycle redundant check is to be activated, performing the cycle redundant check for the set of decoded sequences; and
   determining the likelihood of successful decoding based on a result of the cycle redundant check.

9. The first device of claim 1, wherein the first device comprises a receiving device and the second device comprises a transmitting device.

10. A method comprising:
    generating a set of decoded sequences of an encoded signal received from a second device;
    determining an activation state of a cycle redundant check based on an actual distribution property associated with the set of decoded sequences and a reference distribution property associated with the set of decoded sequences; and
    determining a likelihood of successful decoding at least based on the activation state.

11. The method of claim 10, wherein generating the set of decoded sequences comprises:
    constructing a binary tree for decoding the encoded signal;
    determining a plurality of decoding paths by performing a traversal procedure of the binary tree; and
    generating the set of decoded sequences based on the plurality of decoding paths.

12. The method of claim 10, further comprising:
    determining an estimation of a block error rate for the signal;

determining a number of bits for checking the set of decoded sequences;

determining a threshold probability of difference between the reference distribution property and the actual distribution property based on a target false alarm rate for decoding the signal the estimation of the block error rate and the number of bit;

determining the actual distribution property based on the set of decoded sequences; and determining the reference distribution property based on the threshold probability and the actual distribution property.

13. The method of claim 12, wherein the bits for the checking comprises at least one of following:

a first set of bits for performing the cycle redundant check, or a second set of bits for performing a parity check.

14. The method of claim 10, further comprising:

determine values characterizing an accuracy of a decoding path for each decoded sequence of the set of decoded sequences based on bits in each decoded sequence; and determining the actual distribution property based on the values.

15. The method of claim 10, wherein determining the activation comprises:

comparing the reference distribution property with the actual distribution property; and in accordance with a determination that the actual distribution property is less than the reference distribution property, activating the cycle redundant check for the set of decoded sequences.

16. The method of claim 10, wherein determining the likelihood of successful decoding comprises:

in accordance with a determination that the activation state indicating that the cycle redundant check fails to be activated, determining a failure of the decoding.

17. The method of claim 10, wherein determining the likelihood of successful decoding comprises:

in accordance with a determination of the activation state indicating that the cycle redundant check is to be activated, performing the cycle redundant check for the set of decoded sequences; and determining the likelihood of successful decoding based on a result of the cycle redundant check.

18. The method of claim 10, wherein the first device comprises a receiving device and the second device comprises a transmitting device.

19. A non-transitory computer readable medium comprising program instructions for causing an apparatus to perform at least:

generating a set of decoded sequences of an encoded signal received from a second device;

determining an activation state of a cycle redundant check based on an actual distribution property associated with the set of decoded sequences and a reference distribution property associated with the set of decoded sequences; and determining a likelihood of successful decoding at least based on the activation state.

* * * * *